Dec. 9, 1952 R. V. LITTLE, JR., ET AL 2,621,305

CATHODE-RAY TUBE POWER SUPPLY

Filed Jan. 2, 1951

INVENTORS
RALPH V. LITTLE, JR. &
LOUIS L. EVANS
BY Morris A. Rabkin
ATTORNEY

Patented Dec. 9, 1952 2,621,305

UNITED STATES PATENT OFFICE 2,621,305

CATHODE-RAY TUBE POWER SUPPLY

Ralph Vinton Little, Jr., Swarthmore, Pa., and Louis Loness Evans, Audubon, N. J., assignors to Radio Corporation of America, a corporation of Delaware Application January 2, 1951, Serial No. 204,028

13 Claims. (Cl. 315—14)

This invention relates to improvements in cathrode ray tube voltage supply systems, and particularly to an improved arrangement for maintaining proper focus of the cathode ray beam. While not limited thereto, the present invention finds particular application to, and will be described with special reference to, cathode ray tubes of the type used in television systems; so-called "kinescope" tubes.

In conventional operation of television kinescopes, it has been found that in order to maintain proper focus of the cathode ray beam, a constant ratio should be maintained between the voltages applied to the first and second anodes. Thus, for example, if the second anode voltage changes say, 5%, then the first anode voltage also should change 5% to maintain proper focus. If the power supply used is reasonably well regulated, these voltage relationships are not difficult to maintain under normal operating conditions.

However, when the kinescope is operated at very high current levels, it has been found that defocussing may occur even though the ratio between the anode voltages is kept constant. For example, in the case of projection-type television kinescopes, utilizing comparatively high beam currents, it has been found that the cathode ray beam tends to defocus, particularly during intervals when the scene being televised has a "high brightness" level.

While the reason for this phenomenon is not entirely understood, it is thought to be related in part, to the fact that the diameter of the cathode ray beam tends to increase as the beam density increases. This change in diameter apparently requires a different relation between the anode voltages, in order to maintain the beam focus, than is required at lower current levels. On the other hand, if the supply voltage changes, it is necessary to maintain this new anode voltage ratio which is required at high current levels, just as it is necessary to maintain the proper ratio at lower current levels.

It is, therefore, a general object of the present invention to provide an improved cathode ray tube power supply system adapted to prevent beam defocussing notwithstanding changes in the cathode ray tube current.

Another object of the invention is to provide an improved high voltage control circuit for a cathode ray tube.

In accordance with the invention, the foregoing and other related objects are attained by provision of a control circuit which reduces the first anode voltage of the cathode ray tube when the tube current increases, as it has been found that such change in first anode voltage will prevent defocussing of the cathode ray when the tube current changes.

Figure 1:
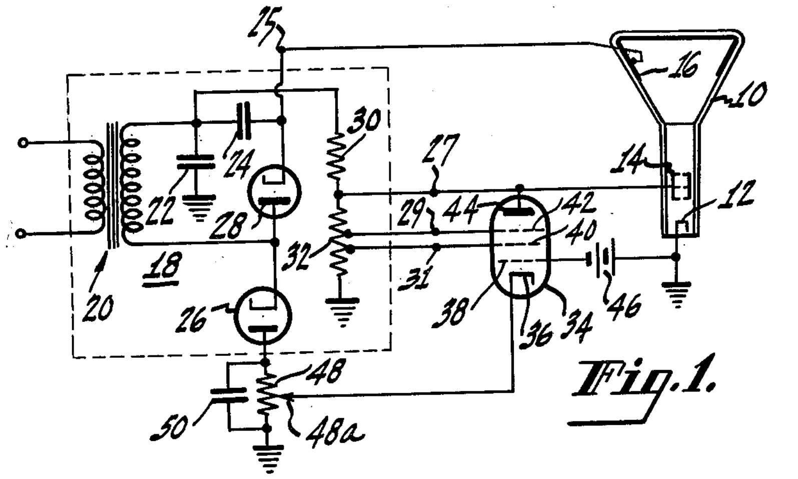
Figure 2:
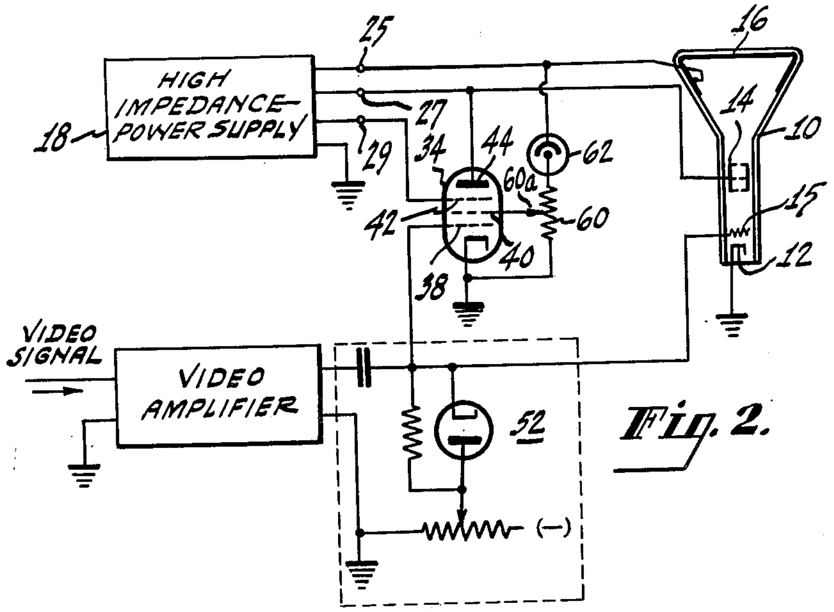

A more complete understanding of the invention can be had by reference to the following description of ilustrative embodiments thereof, when considered in connection with the accompanying drawing, wherein:

Fig. 1 is a schematic diagram of a television kinescope power supply system arranged in accordance with the invention, and Fig. 2 is a schematic diagram of a modified form of television kinescope power supply system further illustrating the principles of the invention.

Referring to Fig. 1, there is shown a television kinescope tube 10, having a cathode 12, a first anode 14, and a second anode 16, the latter comprising a conductive coating on the inner tube surface adjacent the "screen" end thereof. Other elements of the tube 10 are not shown in Fig. 1 as they are not necessary to an understanding of the present invention. As is well known, the first and second anodes 14, 16 are cooperable to focus (at the screen end of the tube 10) the cathode ray provided by current emitted from the cathode 12.

Energizing voltages for the tube 10 are provided by a power supply system 18, illustratively shown as comprising a so-called voltage doubler circuit. This circuit 18 includes a transformer 20 through which alternating voltage can be supplied, from any suitable source (not shown), to charge a pair of capacitors 22, 24 through rectifiers 26, 28. Since the power supply 18 generally is conventional, a detailed description thereof will not be given. Suffice to state that the rectifiers 26, 28 will operate to store on the capacitors 22, 24 unidirectional voltages substantially equal to the peak transformer output voltage, so that the sum of the capacitor voltages will be substantially twice the peak output voltage of the transformer. For example, the sum of the capacitor voltages may be of the order of eighty kilovolts, the voltage across each being approximately forty kilovolts.

The second anode 16 of the kinescope tube 10 is connected to a high voltage output terminal 25 to receive the full output voltage of the power supply 18, while the first anode 14 is connected to an intermediate voltage output terminal 27. In the specific power supply 18 shown in Fig. 1, the terminal 27 comprises the junction of a pair of voltage divider resistors 30, 32. The voltage divider resistors 30, 32 are connected across the capacitor 22 and suitably proportioned to give the proper nominal ratio of second anode to first anode voltage. In a typical case, the nominal value of first anode voltage may be of the order of 20 kilovolts.

If the tube 10 were to be operated only at comparatively low current levels, the system thus far described normally would function satisfactorily. Assuming that the first anode 14 does not draw any appreciable amount of current, the cathode ray beam in the tube 10 could be expected to stay reasonably well focussed. The resistor 32 might comprise a potentiometer having a tap connected to the first anode 14 to permit nominal adjustment of the anode voltages ratio.

However, as previously explained, if the tube 10 is operated at high current level, it has been found that the beam tends to become defocussed even if the ratio between the anode voltages is kept constant. It has also been found that this defocussing effect can be overcome if the first anode voltage is reduced as the beam current increases.

Accordingly, in accordance with the invention, there is provided a control circuit which is connected to cause a decrease in the first anode voltage, by increasing the voltage drop across the resistor 30, when the beam current increases. This control circuit includes a vacuum tube 34 connected in shunt with the lower voltage divider resistor 32.

Since the first anode voltage ordinarily will be considerably greater than the maximum permissible operating voltage of an ordinary tube, the control tube 34 preferably comprises a modified kinescope tube. Satisfactory results have been obtained by replacing the usual second anode coating in such tube with a high dissipation metal anode disposed in the beam path. The other elements of the electron gun in the tube can be utilized in their conventional form. It has been found that with the second anode modification just referred to, the kinescope tube will function in a manner very analogous to an ordinary pentode vacuum tube. Therefore, the tube 34 has been shown schematically as a pentode tube, having a cathode 36, a control grid 38, a screen grid 40, a suppressor grid 42 and an anode 44. Structurally, these electrodes 36—44 comprise the cathode, first and second grids, and first and (modified) second anodes, respectively, of the modified kinescope tube. For convenience, the pentode terminology will be used hereinafter.

The anode 44 of the tube 34 is connected to the intermediate voltage output terminal 27 in common with the first anode 14 of the tube 10. The screen and suppressor grids 40, 42 of the tube 34 are connected to additional taps 29, 31 on the lower voltage divider resistor 32. The control grid 38 is connected to a fixed source of negative bias voltage, shown as a battery 46.

The cathode 36 of the tube 34 is connected to the adjustable tap 48*a* of a potentiometer 48. This potentiometer 48 is connected in the negative return lead of the power supply 18, and is shunted by a capacitor 50. Therefore, it can be seen that the voltage at the potentiometer tap 48*a* will be a negative voltage (with respect to "ground"), of amplitude determined by the cathode ray tube current. Accordingly, the control grid-to-cathode voltage of the tube 34 will be determined by the cathode ray tube current.

The voltage drop across the resistor 30 will be a function of the current drawn by the control tube 34. In turn, the current drawn by the tube 34 will be a function of the control grid-to-cathode voltage thereof. Since the control grid 38 is connected to a fixed voltage point, the factor determinative of the control tube current will be the variable cathode voltage thereof.

The anode voltages of the tube 10 first are adjusted (by setting the potentiometer tap 48*a*) so that the cathode ray beam in the tube 10 is properly focussed at a low value of beam current. Thereafter, if the beam current increases, the voltage at the potentiometer tap 48*a* will become more negative. This will effectively make the control grid 38 less negative with respect to the cathode 36, causing the current through the control tube 34 to increase. In turn, the voltage drop across the resistor 30 will increase, reducing the first anode voltage of the tube 10 sufficiently to maintain proper focus of the beam therein.

Throughout the foregoing discussion, it has been assumed that the power supply output voltage remains essentially constant, and that the first anode voltage only is changed to provide a new ratio of cathode ray tube anode voltages when the beam current changes. If the power supply 18 is not capable of maintaining essentially constant output voltage within the limits of system operation, an additional problem arises.

The control tube 34 has the usual "constant current" characteristic of a pentode vacuum tube. That is, for a given value of control grid-to-cathode voltage, the tube current will have a relatively constant value for relatively wide variations in anode voltage, provided the screen and suppressor grid voltages are kept essentially constant.

Therefore, it can be seen that a change in the power supply output voltage might cause defocussing of the beam in the tube 10. Since the current through the control tube 34 can be substantially independent of anode voltage changes, a change in the power supply output voltage may not cause any change in the voltage drop across the resistor 30. If this occurs, there would be a constant difference between the second and first anode voltage with relatively large changes in power supply output, rather than the constant ratio that is needed to maintain focus. Assume, for example, that the nominal second anode voltage is 80 kilovolts, and the nominal first anode voltage 20 kilovolts. Assume, further, that the power supply output changes so that the second anode voltage drops 2.5 per cent to 78 kilovolts. The proper corresponding change in first anode voltage would be a drop to 19.5 kilovolts. With a constant voltage maintained across the resistor 30, however, the first anode voltage may drop to, say, 19 kilovolts. This would cause defocussing of the beam in the tube 10 regardless of any effect due to beam current changes.

Where the power supply output voltage is not subject to much variation, the difficulty arising from the constant current characteristic of the control tube 34 will be adequately compensated by connecting the screen and suppressor grids 40, 42 to the output terminals 29, 31. The changes in voltage across the resistor 32 which will result from changes in power supply output voltage will change the current through the control tube 34 sufficiently to maintain the ratio of the anode voltages nearly constant. However, if it is found that these changes in the screen and suppressor grid voltages do not provide adequate compensation, the arrangement shown in Fig. 2 can be adopted. Also shown in Fig. 2 is an alternative source of control grid-to-cathode voltage for the control tube 34.

In the system shown in Fig. 2, the control grid voltage for the control tube 34 comprises the video signal applied to the kinescope control grid 15. Since the beam current in the kinescope tube 10 will be determined by the video signal applied to the control grid thereof, the video signal will be representative of the kinescope beam current. Accordingly, the control grid 38 of the control tube 34 is connected in common with the kinescope control grid 15 to the output of the "D. C. restorer" circuit 52 of the video signal network.

As the video signal changes, causing changes in the kinescope current, it can be seen that the current through the control tube 34 will change correspondingly to raise and lower the first anode voltage of the kinescope as the beam current increases and decreases.

In Fig. 2, the power supply 18 is shown in block form, and is designated as a "high impedance" power supply to indicate that the internal impedance thereof is sufficiently high to cause an appreciable decrease in output voltage when the output current increases. It will be understood that the internal impedance of the supply 18 will depend on the sizes and ratings of the transformers, capacitors, and other elements used therein.

With a high impedance power supply, it is necessary to provide some means for maintaining the ratio of anode voltages at the proper value since the power supply output voltage usually will change as the load current changes. In the system of Fig. 2, the screen grid 40 in the control tube 34 is connected to the tap 60*a* of a potentiometer 60 which is connected in series with a voltage regulator element 62 across the second anode circuit of the kinescope 10. The regulator element 62 may comprise a so-called "corona" regulator, or any equivalent element which has the characteristic of conducting different amounts of current at constant voltage drop. The regulator element 62 will transfer substantially all of any second anode voltage change to the potentiometer 60, thereby providing a large compensating voltage for the control tube screen grid 40. The sequence of operations in Fig. 2 may be somewhat as follows:

A decrease in the output voltage of the power supply 18 would cause a decrease in the voltage at the high voltage terminal 25. The voltage at the intermediate output terminal 27 also would decrease. Due to the constant current characteristic of the control tube 34, the change in output voltage at the intermediate terminal 27 would tend to be greater than it should be to maintain the proper ratio of cathode ray tube anode voltages. However, the voltage at the control tube screen grid 40 will drop as the second anode voltage decreases, thereby decreasing the current through the control tube 34. This will decrease the internal voltage losses in the circuit supplying voltage to the output terminal 27, thereby causing the first anode voltage change to be more nearly proportional to the second anode voltage change. To avoid confusion, it should be noted that the compensating effect provided by the screen grid 40 is distinct from the effect provided by changes in the control grid voltage due to changes in the video signal. It should also be noted that the screen grid compensation circuit ordinarily will not be required if the control tube 34 does not have a constant current characteristic.

The correct nominal ratio between second and first anode voltage in Fig. 2 can be established by adjusting the potentiometer tap 60*a*.

One of the advantages of the circuits of Figs. 1 and 2 not previously mentioned resides in the fact that no high voltage potentiometers are required for adjusting the focus of the kinescope beam. As is well known, potentiometers designed to handle voltages of the order of twenty or more kilovolts are difficult to construct, relatively costly, and a likely source of operational difficulties.

From the foregoing, it will be apparent that the present invention provides an efficient dual purpose control circuit for a kinescope power supply system, compensating for defocussing effects due both to changes in kinescope current and changes in power supply output voltage.

What is claimed is:

1. In a voltage supply system for a cathode ray tube of the type having a first and a second anode cooperable to focus the cathode ray beam provided by current flow through said tube, in combination, a voltage source, a first voltage supply circuit connecting said first anode to said source to supply to said first anode unidirectional voltage of magnitude inversely proportional to the current drawn through said first circuit, a second voltage supply circuit connecting said second anode to said source to supply unidirectional voltage to said second anode, and a third circuit connected to said first circuit and comprising means to increase the current drawn through said first circuit in response to an increase in the current flowing through said tube.

2. The combination defined in claim 1 wherein said means in said third circuit includes a potentiometer common to said first and second circuits for adjusting the ratio between the voltages applied by said first and second circuits to said first and second anodes.

3. The combination defined in claim 1 wherein said means in said third circuit includes an electron tube having an anode, a cathode and a control grid, and means to apply between said control grid and said cathode a voltage proportional to said cathode ray tube current.

4. The combination defined in claim 3 wherein said last-mentioned means comprises a potentiometer common to said first and second circuits and having an adjustable tap, said cathode being connected to said tap.

5. In a voltage supply system for a cathode ray tube of the type having a first and a second anode cooperable to focus the cathode ray beam provided by current flow through said tube and having a control electrode to which signals are applied to control said current, in combination, a voltage source, circuits connecting said anodes to said source to supply to said anodes unidirectional voltages of different magnitudes, an electron tube included in the circuit connecting said first anode to said voltage source, impedance means in series with said electron tube in said first anode circuit providing with said electron tube a voltage divider, an intermediate point on said voltage divider to which said first anode is connected, said electron tube having a control grid connected to receive signals applied to said cathode ray tube control grid.

6. The combination defined in claim 5 wherein said electron tube is provided with an additional current control electrode connected to said second anode circuit to receive a voltage proportional to that applied to said first anode.

7. The combination defined in claim 6 wherein said connection from said second anode circuit to said additional electrode comprises a voltage divider network having as an element thereof a voltage regulator.

8. In a cathode ray tube system comprising: a cathode ray tube having first and second anodes, a unidirectional voltage source having first and second voltage output terminals, and circuits connecting said first and second anodes to separate ones of said output terminals to draw current through said cathode ray tube; the combination with said system of impedance means in said first anode circuit to decrease the voltage applied to said first anode upon an increase in current flow through said first circuit, a vacuum tube having an anode, a cathode and a control grid, a circuit connecting said vacuum tube to said first anode circuit to pass current through said impedance means in an amount determined by the voltage applied between said control grid and said cathode, a circuit applying to said control grid a voltage negative with respect to said cathode, and means connected in said last named circuit to decrease said last named voltage in response to an increase in the current through said cathode ray tube.

9. The combination defined in claim 8 wherein said means in said last named circuit comprises an impedance common to said first and said second anode circuits.

10. The combination defined in claim 8 wherein said vacuum tube is provided with an additional current control electrode, said additional control electrode being connected to receive from said voltage source a voltage proportional to the voltage applied to said second anode.

11. The combination defined in claim 8 wherein said impedance means comprises a resistor connected between said voltage source and said first anode.

12. In a cathode ray tube system comprising: a cathode ray tube having first and second anodes, a unidirectional voltage source, and circuits to apply to said anodes from said source voltages of different predetermined magnitudes; a control network to decrease said voltage applied to said first anode in response to an increase in the current flowing through said tube, said control circuit comprising impedance means in the circuit applying said voltage to said first anode to reduce the voltage applied to said first anode in response to an increase in the current through said impedance means, a circuit connected to pass current through said impedance means, a vacuum tube connected in said last named circuit, said vacuum tube having electrodes including a control grid and a cathode, and means to apply between said control grid and said cathode a voltage of magnitude proportional to the current flowing through said cathode ray tube as a control of the current through said vacuum tube and said impedance means.

13. The combination of a cathode ray tube having first and second anodes, a unidirectional voltage source having high and intermediate voltage output terminals, a circuit connecting said first anode to said intermediate voltage output terminal, means in said circuit for decreasing the voltage applied to said first anode in response to an increase in current flow through said circuit, a vacuum tube connected in parallel with said circuit, said vacuum tube having an anode, a cathode and a control grid, said vacuum tube anode being connected to said cathode ray tube first anode, means to apply voltage between said control grid and said cathode, and means to control the grid-to-cathode voltage of said vacuum tube as a function of the beam current in said cathode ray tube.

RALPH VINTON LITTLE, Jr.
LOUIS LONESS EVANS.

REFERENCES CITED

The following references are of record in the file of this patent:

UNITED STATES PATENTS

| Number | Name | Date |
|---|---|---|
| 2,173,221 | Ballard | Sept. 19, 1939 |
| 2,218,720 | Rinia | Oct. 22, 1940 |
| 2,291,682 | Blumlein et al. | Aug. 4, 1942 |
| 2,302,876 | Malling | Nov. 24, 1942 |
| 2,371,897 | Knick | Mar. 20, 1945 |
| 2,434,196 | Cawein | Jan. 6, 1948 |
| 2,459,602 | Ulman | Jan. 18, 1949 |
| 2,555,147 | Meagher | May 29, 1951 |
| 2,567,377 | Holbrook | Sept. 11, 1951 |